June 3, 1969
P. KING
3,447,822
COUPLING
Filed Oct. 6, 1967
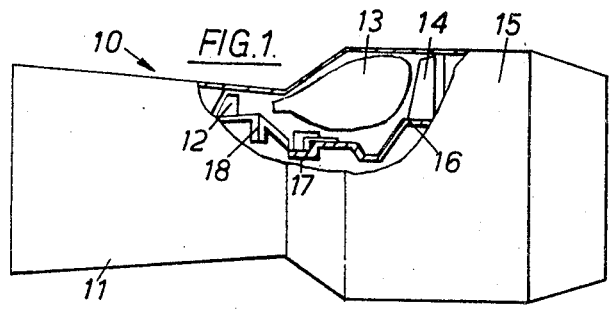
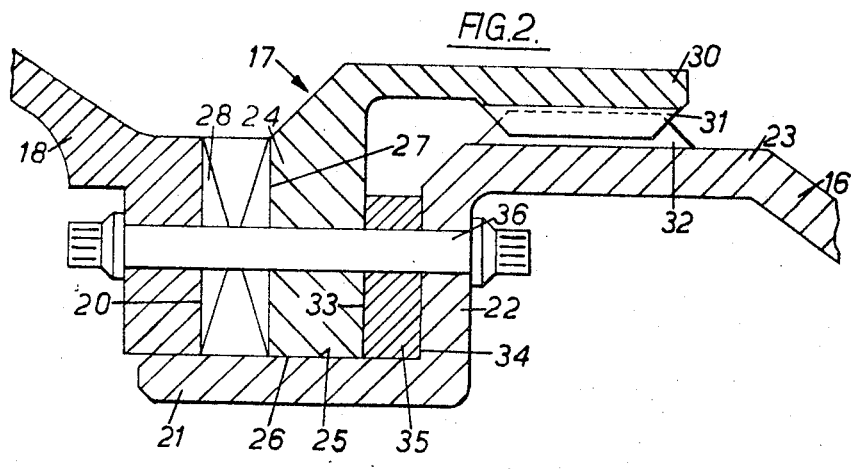
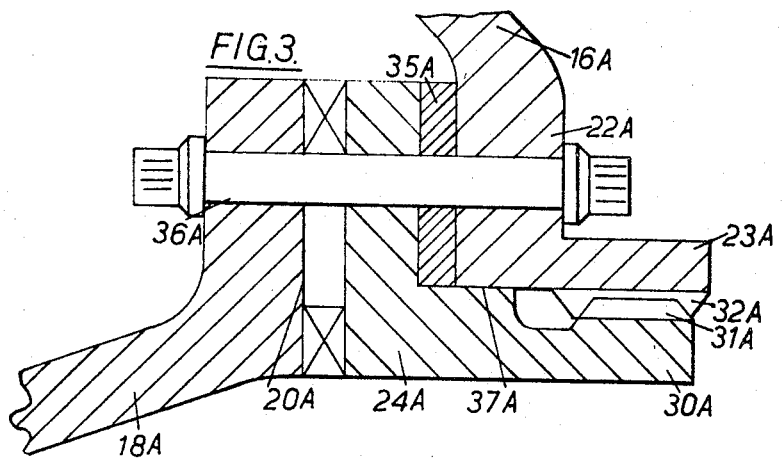
Inventor
Peter King
By
Cushman, Darby & Cushman
Attorneys

United States Patent Office 3,447,822
Patented June 3, 1969

3,447,822
COUPLING
Peter King, Derby, England, assignor to Rolls-Royce Limited, Derby, Derbyshire, England, a British company
Filed Oct. 6, 1967, Ser. No. 673,447
Claims priority, application Great Britain, Oct. 11, 1966, 45,452/66
Int. Cl. F16d 1/06; F16b 7/04, 1/02
U.S. Cl. 287—53                                4 Claims

ABSTRACT OF THE DISCLOSURE

The shafts of a gas turbine engine are coupled together by a coupling member which is secured to one of the shafts and which has a radial face provided with dogs which mesh with dogs on an end face of the other shaft.

---

This invention concerns a coupling of the kind in which the shafts to be coupled together have radial faces provided with interengaging dogs. One example of this particular kind of coupling is sold under the registered trademark "Curvic."

In the course of forming the said dogs, a very large cutter is passed in a radial plane over the said radial faces. It has therefore been possible previously to use such couplings only where the surrounding structure did not prevent the passage of this large cutter. This, however, has constituted a serious limitation in the use of such couplings. Thus, the shafts which are to be interconnected by the coupling may have adjacent radially offset portions which cannot therefore be machined with the interengaging dogs.

According, therefore, to the present invention, there is provided a coupling comprising a first shaft having a radially disposed end face, a second shaft having an end portion and a radially extending portion, the end portion being disposed adjacent to but radially offset from the said end face, a coupling member by means of which the first and second shafts are coupled together, the coupling member being secured to the second shaft and having a radially extending part provided with first and second axially spaced radial faces, interengaging dogs which are respectively provided on the said first radial face on the coupling member and on the end face on the first shaft, and a washer being located between the second radial face and the radially extending portion of the second shaft.

The coupling member is preferably an annular coupling member which engages and is disposed about or within a portion of the second shaft so as to be radially located thereby.

The coupling member may, moreover, be splined to the second shaft. Thus, the coupling member may have an annular flange which is splined to the second shaft, and the annular flange may, if desired, engage and be disposed within the said portion of the second shaft.

The invention also comprises a gas turbine engine provided with a coupling as set forth above, the first and second shafts forming portions of engine shafting which interconnects compressor and turbine means of the engine.

The invention is illustrated, merely by way of example, in the accompanying drawings, in which:

FIGURE 1 is a diagrammatic representation, partly in section, of a gas turbine engine provided with a coupling according to the present invention, FIGURE 2 is a broken away sectional view illustrating part of the structure of FIGURE 1 on a larger scale, and FIGURE 3 is a sectional view illustrating an alternative embodiment of the present invention.

In FIGURE 1 there is shown a gas turbine engine 10 having an engine casing 11 within which there are mounted in flow series a compressor 12, combustion equipment 13, and a turbine 14, the turbine exhaust gases being directed to atmosphere through an exhaust duct 15.

The turbine 14 is mounted on a shaft 16 which is connected by a coupling 17 to a shaft 18 on which the compressor 12 is mounted.

The construction of the coupling 17 is shown in greater detail in FIGURE 2. As will be seen from FIGURE 2, the shaft 18 has a radially disposed end face 20 whose radially inner end is disposed in contact with but radially outwardly of an axially extending end portion 21 of the shaft 16. The end portion 21 is connected by a radially outwardly extending portion 22 of the shaft 16 to a further axially extending portion 23 thereof, the end face 20 being axially spaced from the radially extending portion 22.

Mounted about and in engagement with the portion 21 is an annular coupling member 24 whose inner surface 25 is seated against a cylindrical surface 26 on the portion 21. The coupling member 24, which serves to couple the shafts 16, 18 to each other, and which is radially located by the engagement of the surfaces 25, 26, has a radially extending part provided with oppositely facing radial faces 27, 33. The faces 20, 27 are respectively provided with inter-engaging dogs which are indicated diagrammatically at 28.

The coupling member 24 has an annular axially extending flange 30 which is provided internally with axially extending splines 31 which mesh with axially extending splines 32 on the shaft portion 23. Relative circumferential movement between the coupling member 24 and shaft 16 is thus prevented.

The shaft portion 22 is provided with a radial face 34 and an annular washer 35 is sandwiched between the radial face 34 and the radial face 33 of the coupling member 24.

The annular coupling member 24 is also secured to the shafts 16, 18 by means of a plurality of angularly spaced apart bolts 36 which pass through the end face 20, the coupling member 24, the washer 35 and the shaft portion 22.

As will be appreciated by varying the axial thickness of the washer 35, the axial length of the assembly may be varied for setting up purposes.

In FIGURE 3 there is shown a coupling which is generally similar to that of FIGURE 2 and which for this reason will not be described in detail, the parts of FIGURE 3 which are similar to those of FIGURE 2 being given the same reference numeral with the addition of the suffix A.

In the FIGURE 3 construction, however, the end face 20A is disposed radially inwardly, as opposed to radially outwardly, of the adjacent end portion 22A of the shaft 16A. Moreover, the annular flange 30A, which is provided with the splines 31A engages and is disposed within a cylindrical surface 37A on the shaft portion 23A so as to be radially located thereby, whereas the radial location of the coupling member 24 is effected by the interengagement of the surfaces 25, 26.

As will be appreciated, a coupling member such as 24 or 24A can easily be made regardless of where it is to be mounted, the only in situ machining necessary being to provide a cylindrical surface such as 26 or 37A for engagement by the coupling member, and to provide axially extending splines such as 32 or 32A for engagement by the splines 31, 31A.

I claim:
1. A coupling comprising a first shaft having a radially disposed end face, a second shaft having an end portion and a radially extending portion, said end portion of said second shaft being disposed adjacent to the said end face of said first shaft, a coupling member by means of which the first and second shafts are coupled together, the coupling member being secured to the shaft and having a radially extending part provided with first and second axially spaced radial faces, interengaging dogs which are respectively provided on the said first radial face on the coupling member and on the said end face on the first shaft, and a washer sandwiched between said second radial face of said coupling member and said radially extending portion of said second shaft.

2. A coupling as claimed in claim 1 in which the coupling member is an annular coupling member which engages and is secured to said end portion of the second shaft so as to be radially located thereby.

3. A coupling as claimed in claim 1 in which the coupling member has an annular flange which is splined to the second shaft.

4. A coupling as claimed in claim 3 in which the said annular flange engages and is disposed within the said end portion of the second shaft.

References Cited

UNITED STATES PATENTS

| | | | |
|---|---|---|---|
| 2,342,568 | 2/1944 | Allen | 287—104 X |
| 2,744,395 | 5/1956 | Massey et al. | 64—9 |

FOREIGN PATENTS 1,340,083  9/1963  France.

CARL W. TOMLIN, *Primary Examiner.*

W. L. SHEDD, *Assistant Examiner.*

U.S. Cl. X.R.

64—9; 287—103, 129